United States Patent
Poggi et al.

(10) Patent No.: US 10,099,654 B2
(45) Date of Patent: Oct. 16, 2018

(54) ANTI-THEFT DEVICE FOR A MOTOR VEHICLE STEERING COLUMN

(71) Applicant: U-SHIN FRANCE SAS, Creteil (FR)

(72) Inventors: Patrice Poggi, Creteil (FR); Alix Della Fiorentina, Creteil (FR)

(73) Assignee: U-SHIN FRANCE SAS, Creteil (FR)

( * ) Notice: Subject to any disclaimer, the term of this patent is extended or adjusted under 35 U.S.C. 154(b) by 54 days.

(21) Appl. No.: 15/028,840

(22) PCT Filed: Oct. 20, 2014

(86) PCT No.: PCT/EP2014/072461
§ 371 (c)(1),
(2) Date: Apr. 12, 2016

(87) PCT Pub. No.: WO2015/059103
PCT Pub. Date: Apr. 30, 2015

(65) Prior Publication Data
US 2016/0257285 A1    Sep. 8, 2016

(30) Foreign Application Priority Data

Oct. 21, 2013 (FR) .................................. 13 60254

(51) Int. Cl.
*B60R 25/021* (2013.01)
*E05B 79/10* (2014.01)

(52) U.S. Cl.
CPC .. *B60R 25/02121* (2013.01); *B60R 25/02102* (2013.01); *B60R 25/02115* (2013.01); *E05B 79/10* (2013.01)

(58) Field of Classification Search
CPC .......... E05B 79/00; E05B 79/02; E05B 79/10; B60R 25/00; B60R 25/02; B60R 25/021;
(Continued)

(56) References Cited

U.S. PATENT DOCUMENTS 5,289,707 A    3/1994  Suzuki
5,632,167 A *  5/1997  Kawachi ............... B60R 25/021
                                                    70/1.5
(Continued)

FOREIGN PATENT DOCUMENTS

EP    1 422 114 A1    5/2004
FR    2 965 230 A1    3/2012

OTHER PUBLICATIONS

International Search Report issued in PCT/EP2014/072461 dated Jan. 19, 2015 (2 pages).
(Continued)

*Primary Examiner* — Christopher J Boswell
(74) *Attorney, Agent, or Firm* — Burris Law, PLLC (57) ABSTRACT

The invention relates to an antitheft device for a motor vehicle steering column, comprising: —a locking means mounted in a movable manner between an unlocked position in which it is intended to be disposed away from the steering column and a locked position in which it is intended to prevent said steering column from moving, and—a cam (12) intended to rotate as one with a lock plug (5) in order to actuate the locking means depending on the position of the lock plug (5), characterized in that the cam (12) comprises: —a nonreturn profile (13) intended to engage with a complementary assembly member (15) that is configured to prevent the cam (12) from rotating in the opposite direction once it has reached a predetermined angular position, and —a push-locking recess (14) intended to receive a stop (20, 21) that is intended to engage with a complementary assembly member (15) that is configured to prevent the cam (12) from rotating in a predetermined direction of rotation from a predefined angular position and to allow rotation of the cam (12) by the lock plug (5) being pushed in beforehand.

12 Claims, 6 Drawing Sheets

(58) Field of Classification Search
CPC ........ B60R 25/02102; B60R 25/02105; B60R 25/02107; B60R 25/0211; B60R 25/02113; B60R 25/02115; B60R 25/02118; B60R 25/02121; B60R 25/02123
See application file for complete search history.

(56) References Cited

U.S. PATENT DOCUMENTS

| | | | |
|---|---|---|---|
| 6,327,882 B1 * | 12/2001 | Canard | B60R 25/02118 70/186 |
| 6,354,117 B1 * | 3/2002 | Canard | B60R 25/02121 70/186 |
| 7,302,817 B2 * | 12/2007 | Ohtaki | B60R 25/04 70/186 |
| 8,234,895 B2 * | 8/2012 | Nakamoto | B60R 25/02 70/182 |
| 8,408,031 B2 * | 4/2013 | Hirashita | B60R 25/02153 200/43.01 |
| 9,566,942 B2 * | 2/2017 | Graglia | B60R 25/02128 |
| 2011/0100075 A1 * | 5/2011 | Cho | B60R 25/00 70/183 |
| 2015/0251631 A1 * | 9/2015 | Poggi | B60R 25/02102 70/237 |
| 2016/0207498 A1 * | 7/2016 | Della Fiorentina | B60R 25/02131 |

OTHER PUBLICATIONS

Written Opinion of the International Searching Authority issued in PCT/EP2014/072461 dated Jan. 19, 2015 (4 pages).

* cited by examiner

ANTI-THEFT DEVICE FOR A MOTOR VEHICLE STEERING COLUMN

This invention relates to the field of locks and anti-theft devices for motor vehicle steering columns.

The locking means of anti-theft devices comprises a bolt mounted such that it can move between a retracted position wherein the bolt is held away from a steering column and a protruding position wherein it prevents the steering column of the motor vehicle from moving. The key shaped to match the lock enables the locking means of the motor vehicle to be unlocked.

Most anti-theft devices have additional functions increasing the security of the vehicle and users.

Perfected anti-theft devices are thus known with the "push-to-lock" function, wherein the key cannot be removed from the lock via a simple withdrawal movement in the stop position. The key must be previously pushed into the lock to continue the rotation and then remove the key. This prevents the key from being unintentionally or maliciously removed, especially due to the hazard present if the key is removed when the vehicle is in motion. In particular, this prevents a child transported in a car seat in the front of the vehicle from seizing the key during transport.

The "non-return" function is also known, preventing the user from turning the key to the start position when the combustion engine is already started. This therefore prevents the risks of causing damage to the starter or combustion engine.

In practice, different kinds of anti-theft devices therefore exist, having a plurality of different embodiments used to implement specific functions, due to the multitude of manufacturers present on this market.

One of the purposes of this invention is to manufacture an anti-theft device that is at least partially standardised, enabling a different function to be implemented depending on the model of motor vehicle.

To this end, this invention relates to an anti-theft device for a motor vehicle steering column comprising:
- a locking means mounted in a movable manner between an unlocked position in which it is intended to be disposed away from the steering column and a locked position in which it is intended to prevent said steering column from moving, and
- a cam intended to rotate as one with a lock plug in order to actuate the locking means depending on the position of the lock plug,
characterised in that the cam comprises:
- a non-return profile intended to engage with a complementary assembly member that is configured to prevent the cam from rotating in the opposite direction once it has reached a first predetermined angular position, and
- a push-locking recess intended to receive a stop that is intended to engage with a complementary assembly member that is configured to prevent the cam from rotating in a predetermined direction of rotation from a second predefined angular position and to allow rotation of the cam by the lock plug being pushed in beforehand.

Standardisation of the anti-theft devices is thus obtained, as the vast majority of the components are standardised. The assembly lines are thus significantly simplified.

According to one example embodiment, the push-locking recess and the non-return profile are made on the same side of the cam.

According to one example embodiment, the push-locking recess has an opening that extends in a radial direction.

According to one example embodiment, the non-return profile includes an outward and a return profile, whereby the return profile has a non-return raised edge. The outward and return profiles have, for example, intermediary portions that are axially offset along the rotational axis of the cam.

According to a first configuration of the anti-theft device, the complementary assembly member comprises a control element that is elastically brought back against the non-return profile to prevent the cam from rotating in the opposite direction once it has reached the first predetermined angular position.

For example, the non-return profile engages with a complementary assembly member to prevent the cam from rotating in the opposite direction once it has reached an intermediary position from the start position, the non-return profile being made in the cam to engage with the complementary assembly member between the neutral stop and start positions. This therefore prevents the potential risks of causing damage to the starter or the combustion engine when the driver reignites the electric motor of the starter when the combustion engine is already started.

According to one example embodiment, the control element comprises an elastic member and a control finger, the elastic member being configured to apply two perpendicular forces to the control finger to create a permanent contact between the control element and the non-return profile. The reliability of the contact between the control element and the non-return profile is thus improved.

According to a second configuration of the anti-theft device, the anti-theft device comprises an elastic element intended to be arranged at the rear end of the lock plug and configured to axially push the lock plug.

The stop is, for example, elastically solicited against a shoulder of the lock plug.

For example, the stop comprises a plate and an additional elastic element inserted between the bottom of the push-locking recess and the plate.

The complementary assembly member has, for example, a fin with a portion shaped as a depression manifold and a radial surface consecutive to the portion shaped as a depression manifold, intended to prevent the cam from rotating in a predetermined direction of rotation from the second predefined angular position.

According to one example embodiment, the stop housed in the push-locking recess engages with the complementary assembly member to prevent the cam from rotating in the anti-clockwise direction of rotation from an intermediary position. Via this means, the key cannot be removed from the lock plug by a simple withdrawal movement. The key must be previously pushed into the lock plug to continue the rotation and be able to then remove the key. This prevents the key from being unintentionally or maliciously removed, especially due to the hazard present if the key is removed when the vehicle is in motion.

Other advantages and characteristics shall be better understood upon reading the following description given of a non-limiting example embodiment of the invention, with reference to the appended figures, in which:

In these figures, identical elements have the same reference numbers.

Figure 1:
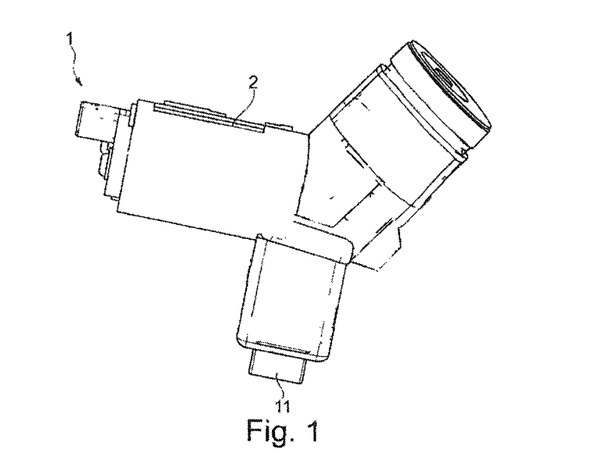
FIG. 1 shows a perspective view of an anti-theft device for a motor vehicle steering column.

FIG. 1 illustrates one example of an anti-theft device 1 intended to be mounted in a motor vehicle to secure the steering.

Figure 2:
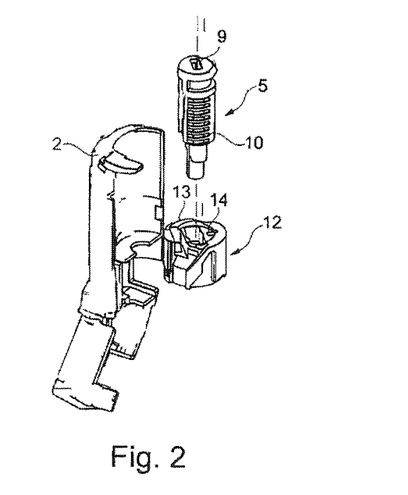
FIG. 2 shows an exploded view of the elements of the anti-theft device in FIG. 1.

The anti-theft device 1 comprises an anti-theft body 2 partially shown in FIG. 2, inside which a lock is intended to be inserted and secured.

The lock comprises a lock plug 5 capable of moving in axial rotation about a rotational axis I-I by the driving of a key in rotation to control a locking means of the anti-theft device 1.

The lock plug 5 has a keyhole 9 fitted at the front end (or head). For the purposes of this document, the term lock plug is understood as very broadly describing any sub-assembly comprising a rotor body through which radial slots 10 are made, capable of receiving tumblers that are mounted such that they can move in radial translation and are coupled with return springs continuously driving them into protruding positions in relation to the rotor body.

According to one example embodiment, the rotation of the key is capable of driving the lock plug 5 in rotation into a first neutral, angular end position, known as the neutral position, such as the "stop" position, two intermediary angular positions, known as the "on" and "accessory" positions and a second angular end position, opposite the first neutral angular end position, known as the "start" position. The neutral STOP, intermediary ACC, ON and start START positions succeed each other when the lock plug 5 is moved from the neutral position STOP to the start position START. After passing via the start position START, the lock plug 5 is elastically brought back by a return spring to its intermediary position ON.

The locking means comprises a bolt 11 mounted such that it can move between a retracted position wherein the bolt 11 is held away from a steering column (not represented) and a protruding position (FIG. 1) wherein it prevents the steering column of the motor vehicle from moving. The bolt 11 is pushed into the protruding position by a bolt spring.

The anti-theft device also comprises a cam 12, rotating as one with the lock plug 5 and coupled with the bolt 11, for example via a pull tab 6 (FIG. 5), such that the rotation of the lock plug 5 is used to control the translation of the bolt 11.

The bolt 11 is generally in the protruding position in the steering column when the lock plug 5 is in the neutral position STOP and the key is removed from the lock plug 5, the bolt 11 remaining inserted, in the retracted position, in the other angular positions of the lock plug 5. Therefore, the cam 12 is used to actuate the locking means depending on the position of the lock plug 5.

Figure 3:
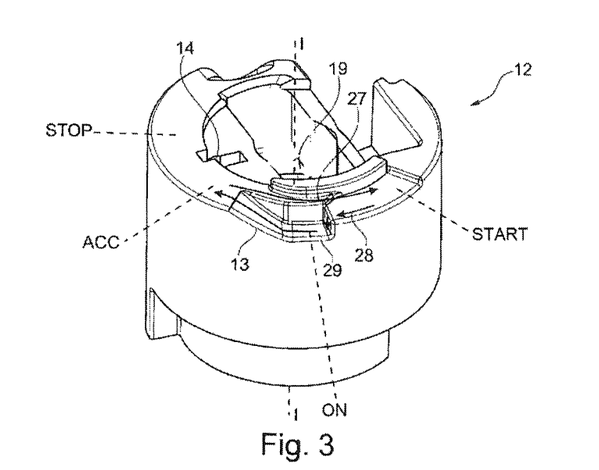
FIG. 3 shows a perspective and side view of the cam of the anti-theft device in FIG. 1.
Figure 4:
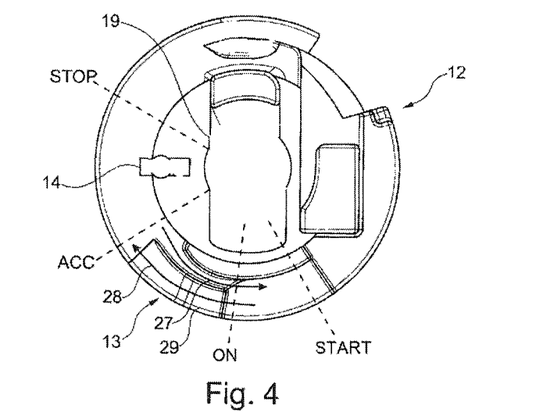
FIG. 4 shows an overhead view of the cam in FIG. 3.

More visible in FIGS. 3 and 4, the cam 12 comprises a non-return profile 13 and a push-locking recess 14. Furthermore, the anti-theft device 1 comprises a complementary assembly member 15.

According to the function that must be performed by the anti-theft device, the complementary assembly member 15 is either configured to engage with the non-return profile 13, or configured to engage with the push-locking recess 14, but cannot be configured to perform these two different functions in the same anti-theft device.

Therefore, according to a first configuration of the anti-theft device, the complementary assembly member 15 is configured to engage with the non-return profile 13 to prevent the cam 12 from rotating in the opposite direction after it has reached a first predetermined angular position and authorise the rotation of the cam 12 when it passes firstly via another predetermined angular position.

For example, the non-return profile 13 engages with the complementary assembly member 15 to prevent the cam 12 from rotating in the opposite direction once it has reached the intermediary position ON from the start position START and authorise the rotation of the cam 12 when it first moves back to the neutral position STOP. The non-return profile 13 is therefore made in the cam 12 to engage with the complementary assembly member 15 between the neutral position STOP and the start position START.

According to a second configuration of the anti-theft device, the push-locking recess 14 receives a stop 20, 21 that is intended to engage with the complementary assembly member 15 that is configured to prevent the cam 12 from rotating in a predetermined direction of rotation from a second predefined angular position and to allow rotation of the cam 12 by the lock plug 5 being pushed in beforehand.

For example, the stop 21, 21 housed in the push-locking recess 14 engages with the complementary assembly member 15 to prevent the cam 12 from rotating in the anti-clockwise direction from an intermediary position, such as the intermediary accessory position ACC.

The push-locking recess 14 is made in an axial end of the cam 12. The push-locking recess 14 is, for example, made in the same side of the cam 12 as the non-return profile 13 (FIG. 4). The push-locking recess 14 and the non-return profile 13 are, for example, arranged closer to the edge than to the centre of the cam 12 to ease engagement with the complementary member 15.

The push-locking recess 14 has, for example, an overall parallelepipedal shape, the opening of which is extended and projects radially.

The non-return profile 13 extends into the periphery of the cam 12. It includes, for example, a separate outward profile 27 (see the arrowed tracing in FIG. 4) and a separate return profile (see the arrowed tracing in FIG. 4). The outward 27 and return 28 profiles have shared start and end points and intermediary portions that are axially offset along the rotational axis I-I of the cam 12. In its offset portion, the return profile 28 has a non-return raised edge 29, for example forming a hollow.

The complementary assembly member 15 includes a mounting 16 secured to the anti-theft body 2 via fastening means 17 such as a groove sliding in a complementary groove of the anti-theft body 2.

Figure 5:
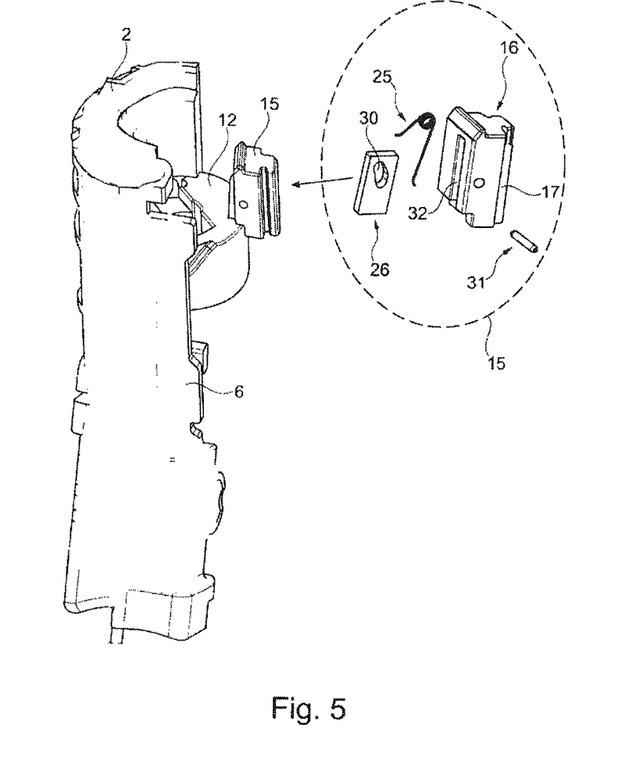
FIG. 5 shows a perspective view of the elements of an anti-theft device in the assembled state, manufactured to perform the "non-return" function, as well as an exploded view of the complementary assembly member of said anti-theft device.
Figure 6:
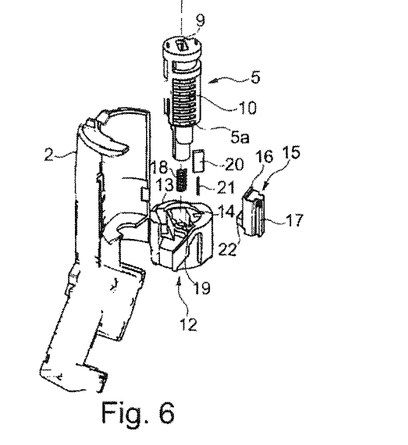
FIG. 6 shows an exploded view of the elements of an anti-theft device manufactured to perform the "push-to-lock" function.

In the first configuration of the anti-theft device shown in FIG. 5, wherein the anti-theft device is manufactured to perform the "non-return" function, the complementary member 15 comprises a control element that is elastically brought back against the non-return profile 13.

More precisely, as shown in FIG. 5, the control element includes an elastic member 25 and a control finger 26, such as a plate, housed in a control recess 32 of the mounting 16 of the complementary assembly member 15.

According to one example embodiment, the elastic member 25 is configured to apply two perpendicular forces to the control finger 26 to create a permanent contact between the control element and the non-return profile 13. The elastic member 25 for example comprises at least one return spring. The reliability of the contact between the control element and the non-return profile 13 is thus improved.

According to one example embodiment, the control finger 26 has a means for fastening to the mounting 16 allowing for relative movement between the control finger 26 and the mounting 16. For example, the fastening means is formed by an oblong hole 30 associated with a pin 31 crossing through the oblong hole 30, the oblong hole 30 being, for example, made in the control finger 26.

During operation, given that the lock is initially in the neutral position STOP, the rotation of the key drives the lock plug 5 and the cam 12 in rotation in the clockwise direction. The control finger 26 is therefore solicited against the outward profile 27 as far as the intermediary position ON. When the user continues to turn the key, the cam 12 rotates as far as the start position START, reaching the return profile 28.

After the start position START, the cam 12 is elastically brought back to the intermediary position ON (anticlockwise direction of rotation). The control finger 26 thus shifts over into the hollow of the non-return raised edge 29 such that any rotation in the opposite direction (clockwise direction of rotation) of the cam 12 to the start position START is prevented.

The driver cannot therefore turn the key to the start position START without firstly passing through the neutral position STOP. To achieve this, the driver must continue to turn the key in the anticlockwise direction of rotation so that the control finger 26 solicited against the return profile 28 is guided by the non-return profile 13 as far as the start of the outward profile 27.

This therefore prevents the potential risks of causing damage to the starter or the combustion engine when the driver reignites the electric motor of the starter when the combustion engine is already started.

FIGS. 6 to 14 shall now be described in the remainder of this document, illustrating an anti-theft device manufactured to perform the "push-to-lock" function.

In this configuration, the anti-theft device comprises an elastic element 18 arranged at the rear end (or tail) of the lock plug 5 and configured to axially push the lock plug 5. The elastic element 18 is, for example, a compression spring. It is, for example, inserted between the cam 12 and the tail of the lock plug 5 and is housed in a central recess 19 of the cam 12, which also houses the tail of the lock plug 5. The elastic element 18 is mounted coaxially between the cam 12 and the lock plug 5. The lock plug 5 therefore forms a slide link with the cam 12, i.e. the lock plug 5 is linked in rotation with the cam 12 but not in translation, the elastic element 18 pushing the lock plug 5 back into the non-depressed position.

The anti-theft device also includes a stop 20, 21 housed in the push-locking recess 14, for example elastically solicited against a shoulder 5a of the lock plug 5. The stop 20, 21 engages with the complementary assembly member 15 to prevent the cam 12 from rotating in a predetermined direction of rotation from a second predefined angular position and to allow rotation of the cam 12 by the lock plug 5 being pushed in beforehand.

Figure 7:
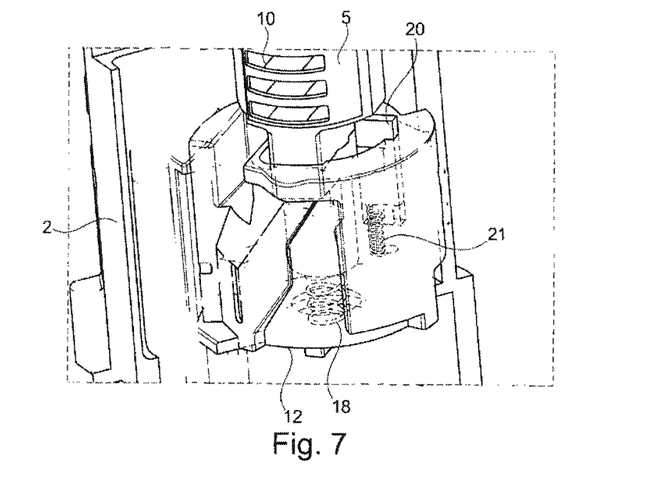
FIG. 7 shows an enlarged view in the assembled state of the anti-theft device in FIG. 6, wherein the cam is represented transparently.

More precisely, the stop comprises, for example, a plate 20, for example made from metal, and an additional elastic element 21 inserted between the bottom of the push-locking recess 14 and the plate 20. The plate 20 therefore forms a slide link with the cam 12, i.e. the plate 20 is driven in rotation by the cam 12 but not in translation, the additional elastic element 21 pushing the plate 20 back into its protruding position towards the shoulder 5a of the lock plug 5, which limits the axial protruding translation of the stop 20, 21 (FIG. 7).

In this second configuration of the anti-theft device, the complementary assembly member 15 has a fin 22, for example formed in one piece with the mounting 16, and extending radially.

According to one example embodiment shown in FIGS. 8 to 13, the fin 22 has a portion shaped as a depression manifold 23, so that during the clockwise rotation of the lock plug 5, the portion shaped as a depression manifold 23 progressively pushes the stop 20, 21 into the push-locking recess 14.

The fin 22 also includes a radial surface 24 (FIG. 8) to prevent the cam 12 from rotating via engagement with the stop 20, 21, when the cam 12 rotates in the predetermined direction of rotation from the second predefined angular position. The radial surface 24 is arranged consecutively to the portion shaped as a depression manifold 23.

Figure 8:
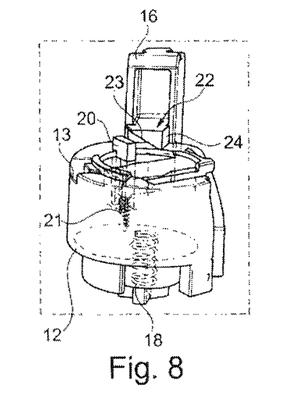
FIG. 8 shows another enlarged view of the elements of the anti-theft device in FIG. 6, wherein the cam is represented transparently in the neutral stop position.

During operation and with reference to FIG. 8, supposing that the vehicle is stopped and that the driver inserts the key into the lock plug 5 to start the vehicle, the cam 12 is therefore in the neutral angular position STOP. It is only in this configuration that the key can be inserted into the lock plug 5 or be removed therefrom according to the rotational axis I-I. As soon as the lock plug 5 leaves this position, the key can no longer be removed.

Figure 9:
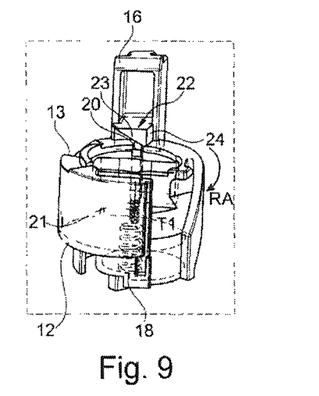
FIG. 9 shows a view that is similar to that in FIG. 8, wherein the cam is in rotation.

The user then begins to turn the key in the clockwise direction of rotation, driving the cam 12 in rotation according to the arrow RA in FIG. 9.

The stop 20, 21 thus enters into contact with the top of the portion shaped as a depression manifold 23 of the fin 22, which progressively pushes the plate 20 axially into the push-locking recess 14 against its elastic return (arrow T1 in FIG. 9).

Once pushed inside the push-locking recess 14, the plate 20 no longer blocks the complementary assembly member 15, thus enabling the cam 12 to continue its rotational trajectory in the clockwise direction.

Figure 10:
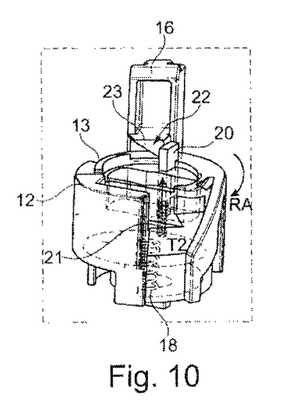
FIG. 10 shows a view that is similar to that in FIG. 9, wherein the cam continues to rotate in the same direction of rotation.

Once the stop 20, 21 has passed the fin 22, the additional elastic element 21 brings the plate 20 back to the protruding position (arrow T2, FIG. 10).

Figure 11:
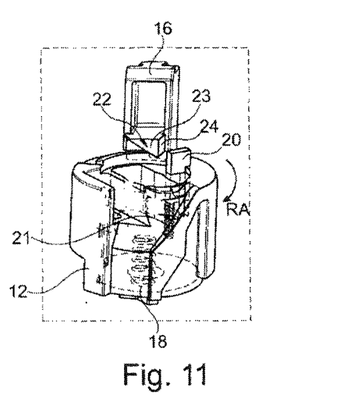
FIG. 11 shows a view that is similar to that in FIG. 10, wherein the cam has reached the accessory intermediary position.

The rotation of the cam 12 then continues as far as the intermediary accessory position ACC (FIG. 11).

Figure 12:
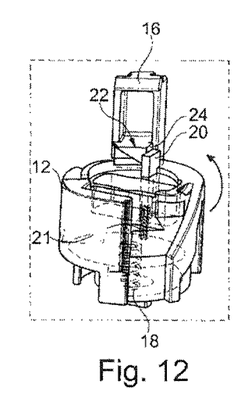
FIG. 12 shows a view that is similar to that in FIG. 11, wherein the cam has pivoted in the opposite direction of rotation and is abutted.
Figure 13:
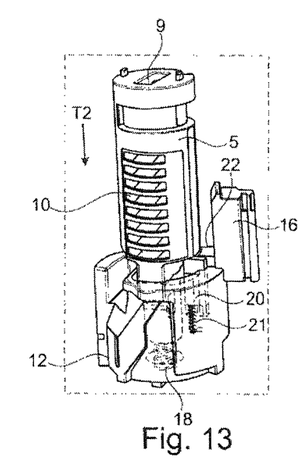
FIG. 13 shows a view of the elements of the anti-theft device in FIG. 6, illustrating the lock plug in the process of being pushed inwards.

From the intermediary accessory position ACC, when the driver turns the key in the opposite direction (in the anticlockwise direction of rotation), the cam 12 is prevented from rotating by the abutment of the plate 20 against the radial surface 24 of the fin 22 (arrow AR; FIG. 12). The lock plug 5 cannot therefore be rotated from the intermediary accessory position ACC to return to the neutral position STOP and remove the key.

Figure 14:
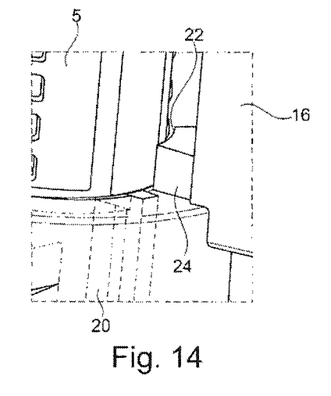
FIG. 14 shows an enlarged view of the elements in FIG. 13, with the lock plug in the depressed position.

In this abutted position, the driver must push the lock plug 5 into the anti-theft body 2 (arrow T2 in FIG. 13), to push the stop 20, 21 back into the push-locking recess 14, enabling the plate 20 to pass the fin 22 (FIG. 14).

Once the fin 22 has been passed, the driver can release the pressure on the lock plug 5, which returns to its initial non-depressed position under the effect of the elastic element 18. The driver can then continue to turn the lock plug 5 to reach the neutral position STOP and remove the key.

Via this means, the key cannot be removed from the lock plug 5 by a simple withdrawal movement in the neutral position STOP. The key must be previously pushed into the lock plug 5 to continue the rotation and be able to then remove the key. This prevents the key from being unintentionally or maliciously removed, especially due to the hazard present if the key is removed when the vehicle is in motion.

An anti-theft device can therefore be manufactured that enables a different function to be implemented depending on the model of motor vehicle.

A standardisation of the anti-theft devices is thus obtained, whereby the cam 12 is standardised to suit either the "push-to-lock" function, for which the key cannot be removed from the lock via a simple withdrawal movement in the stop position, or the "non-return" function, preventing the user from turning the key to the start position when the combustion engine has already been started. The assembly lines are thus significantly simplified.

The invention claimed is:

1. An anti-theft device for a motor vehicle steering column, comprising:
    a locking means mounted in a movable manner between an unlocked position in which the locking means is intended to be disposed away from the steering column and a locked position in which the locking means is intended to prevent said steering column from moving; and
    a cam intended to rotate as one with a lock plug to actuate the locking means depending on the position of the lock plug, wherein the cam comprises:
        a non-return profile intended to engage with a complementary assembly member that is configured to prevent the cam from rotating in an opposite direction once the cam has reached a first predetermined angular position,
        a push-locking recess comprising an opening extending in a radial direction that receives a stop that is configured to engage with the complementary assembly member that is configured to prevent the cam from rotating in a predetermined direction of rotation from a second predefined angular position and to allow rotation of the cam by the lock plug being pushed in beforehand,
    wherein the stop housed in the push-locking recess engages with the complementary assembly member to prevent the cam from rotating in the anti-clockwise direction of rotation from an intermediary position.

2. The anti-theft device according to claim 1, wherein the push-locking recess and the non-return profile are made on the same side of the cam.

3. The anti-theft device according to claim 1, wherein the push-locking recess has an opening that extends in a radial direction.

4. The anti-theft device according to claim 1, wherein the non-return profile includes an outward profile and a return profile, whereby the return profile has a non-return raised edge.

5. The anti-theft device according to claim 4, wherein the outward profile and return profile have intermediary portions that are axially offset along the rotational axis of the cam.

6. The anti-theft device according to claim 1, further comprising an elastic element intended to be arranged at the rear end of the lock plug and configured to axially push the lock plug.

7. The anti-theft device according to claim 6, wherein the stop is elastically solicited against a shoulder of the lock plug.

8. The anti-theft device according to claim 7, wherein the stop comprises a plate and an additional elastic element inserted between the bottom of the push-locking recess and the plate.

9. The anti-theft device according to claim 6, wherein the complementary assembly member has a fin with a portion shaped as a depression manifold and a radial surface consecutive to the portion shaped as a depression manifold, intended to prevent the cam from rotating in a predetermined direction of rotation from the second predefined angular position.

10. The anti-theft device according to claim 1, wherein the non-return profile engages with the complementary assembly member to prevent the cam from rotating in the opposite direction once it has reached an intermediary position (ON) from the start position (START), the non-return profile being made in the cam to engage with the complementary assembly member between the neutral stop (STOP) and start (START) positions.

11. The anti-theft device according to claim 1, wherein the complementary assembly member comprises a control element that is elastically brought back against the non-return profile to prevent the cam from rotating in the opposite direction once it has reached the first predetermined angular position.

12. The anti-theft device according to claim 11, wherein the control element comprises an elastic member and a control finger, the elastic member being configured to apply two perpendicular forces to the control finger to create a permanent contact between the control element and the non-return profile.

* * * * *